United States Patent
Swindle et al.

(10) Patent No.: US 6,779,061 B1
(45) Date of Patent: Aug. 17, 2004

(54) METHOD AND APPARATUS IMPLEMENTING A FIFO WITH DISCRETE BLOCKS

(75) Inventors: Scott A. Swindle, San Diego, CA (US); Lane T. Hauck, San Diego, CA (US); Steve H. Kolokowsky, San Diego, CA (US); Steven P. Larky, Del Mar, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/567,681

(22) Filed: May 9, 2000

(51) Int. Cl.[7] .............................................. G06F 13/12
(52) U.S. Cl. ........................... 710/71; 710/29; 710/33; 710/39; 710/40; 710/52; 710/105
(58) Field of Search ............................. 710/71, 33, 39, 710/40, 105, 29, 52

(56) References Cited

U.S. PATENT DOCUMENTS

| | | | | |
|---|---|---|---|---|
| 5,434,996 A | * | 7/1995 | Bell ........................... | 713/400 |
| 5,649,124 A | * | 7/1997 | Kreidl ......................... | 710/305 |
| 5,748,924 A | * | 5/1998 | Llorens et al. ............... | 341/100 |
| 5,974,486 A | * | 10/1999 | Siddappa ...................... | 710/53 |
| 6,033,441 A | * | 3/2000 | Herbert ....................... | 709/400 |
| 6,070,209 A | * | 5/2000 | Hausauer ..................... | 710/104 |
| 6,247,082 B1 | * | 6/2001 | Lo et al. ..................... | 710/105 |
| 6,247,088 B1 | * | 6/2001 | Seo et al. .................... | 710/305 |
| 6,256,687 B1 | * | 7/2001 | Ellis et al. .................. | 710/53 |
| 6,266,715 B1 | * | 7/2001 | Loyer et al. ................. | 709/212 |
| 6,266,751 B1 | * | 7/2001 | Niescier ...................... | 711/173 |
| 6,370,600 B1 | * | 4/2002 | Hughes et al. ................ | 710/29 |
| 6,389,495 B1 | * | 5/2002 | Larky et al. .................. | 710/53 |
| 6,418,518 B1 | * | 7/2002 | Wen ............................ | 711/154 |
| 6,473,818 B1 | * | 10/2002 | Niu et al. .................... | 711/150 |
| 6,523,081 B1 | * | 2/2003 | Karlsson et al. ............. | 710/305 |

* cited by examiner

Primary Examiner—Jeffrey Gaffin
Assistant Examiner—Niketa Patel
(74) Attorney, Agent, or Firm—Christopher P. Maiorana, P.C.; Robert M. Miller

(57) ABSTRACT

An apparatus comprising one or more storage elements. The one or more storage elements may be configured to switch an input/output between a first domain and a second domain in response to one or more control signals.

20 Claims, 6 Drawing Sheets

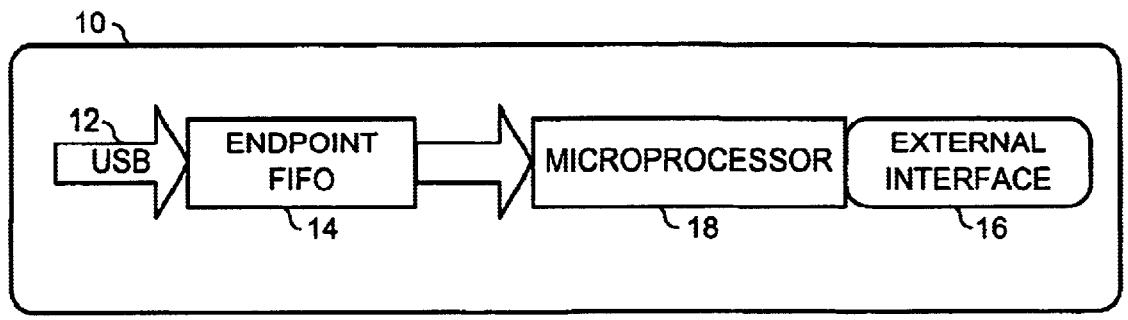
(CONVENTIONAL)
FIG. 1
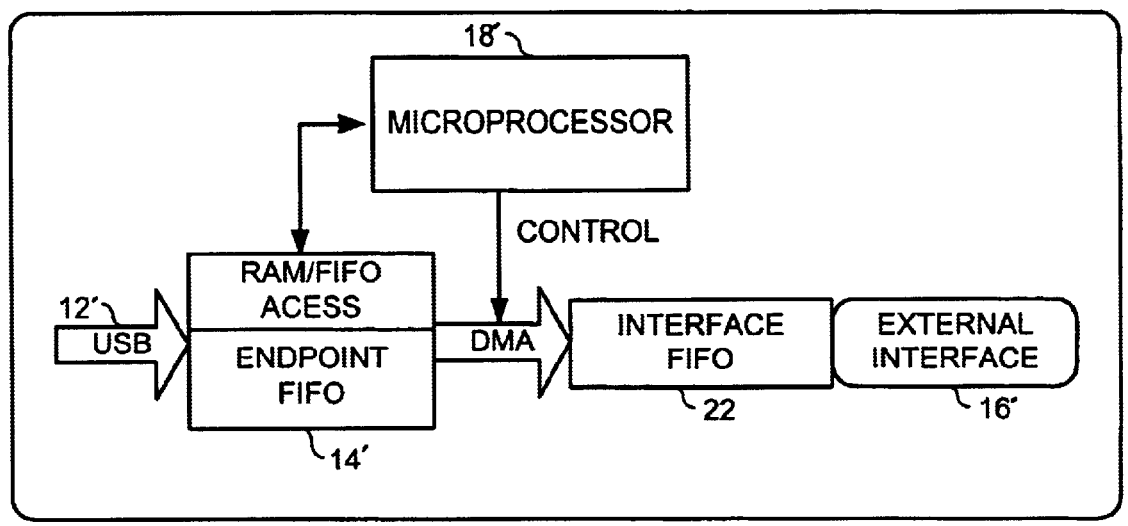
(CONVENTIONAL)
FIG. 2

METHOD AND APPARATUS IMPLEMENTING A FIFO WITH DISCRETE BLOCKS

FIELD OF THE INVENTION

The present invention relates to a method and/or architecture for data transfer generally and, more particularly, to a method and/or architecture for data transfer through a quantum FIFO.

BACKGROUND OF THE INVENTION

First-in-first-out (FIFO) buffers are used to transfer data between a system (domain) operating at a first clock rate and a system (domain) operating at a second clock rate. In a conventional FIFO, data is written to a memory according to a write pointer and read from the memory according to a read pointer. The write and read pointers need to be managed to provide overwrite and underwrite protection.

Referring to FIG. 1, a block diagram of a circuit 10 illustrating data flow in a conventional Universal Serial Bus (USB) chip is shown. Conventional USB chips transfer USB serial data between a first clock domain (i.e., serial bus 12) and an endpoint FIFO 14. The data reaches a second clock domain (i.e., the external interface 16) via programmed transfers through a microprocessor 18. The conventional USB chip 10 provides a low cost, low performance approach suited to low speed systems such as USB mice and keyboards.

Referring to FIG. 2, a block diagram of a circuit 20 illustrating a faster conventional approach is shown. For higher transfer rates, an interface FIFO 22 can reconcile the first clock domain (i.e., the serial bus 12') and the second clock domain (i.e., the external interface 16'). The circuit 20 can provide a higher data transfer rate than the circuit 10 because the microprocessor 18' does not participate in the data transfer between the FIFOs 14' and 22.

Because of the transfer times (FIFO-microprocessor and FIFO-FIFO), the conventional circuits 10 and 20 are not fast enough to economically sustain a data rate of 480 Megabits per second as required by newer bus standards (e.g., USB 2.0, the Universal Serial Bus Specification 2.0, which is hereby incorporated by reference in its entirety). Connecting a standard FIFO directly between the serial bus 12 and the external interface 16 requires extra tag bits to identify data as belonging to a particular endpoint. Also, a standard FIFO does not provide multi-port access to the external interface 16' and the microprocessor 18'. In addition, a standard FIFO can not accommodate the packetized nature of USB data. For example, a USB OUT transfer sends data from a USB host (usually a PC) to an endpoint FIFO of a USB peripheral. After a full packet of data is received, the USB peripheral checks the packet for errors using a Cyclic Redundancy Check (CRC) and other methods. If errors are found, the USB peripheral suppresses an acknowledge signal to indicate to the USB host that the data must be re-transmitted. In a standard FIFO, the external interface can clock out some of the bad data before the USB peripheral detects the error. Recalling erroneous data from a standard FIFO is difficult.

SUMMARY OF THE INVENTION

The present invention concerns an apparatus comprising one or more storage elements configured to switch between a first domain and a second domain in response to one or more control signals.

The objects, features and advantages of the present invention include providing a method and/or architecture for a quantum FIFO that may (i) provide a low cost solution to providing very high bandwidth transfers, (ii) eliminate the internal movement of data bytes, (iii) instantaneously switch discrete FIFO blocks between USB and input/output domains, (iv) provide a FIFO with a zero transfer time, (v) use multiple small single or multi-port RAMs, (vi) allow single and dual-port RAMs to be used as dual and triple-port RAMs, respectively, (vii) eliminate read/write and read/read collision logic, (viii) provide an architecture that uses multiple addressable FIFOs (e.g., USB where the FIFOs are called endpoints), (ix) guarantee that FIFO data presented to external logic is error free, and/or (x) allow a microprocessor or micro-controller to associate packets with particular output FIFOs based on packet data.

BRIEF DESCRIPTION OF THE DRAWINGS

These and other objects, features and advantages of the present invention will be apparent from the following detailed description and the appended claims and drawings in which:

FIG. 1 is a block diagram illustrating an operation of a conventional USB device;

FIG. 2 is a block diagram illustrating an operation of a faster conventional USB device;

DETAILED DESCRIPTION OF THE PREFERRED EMBODIMENTS

Figure 3:
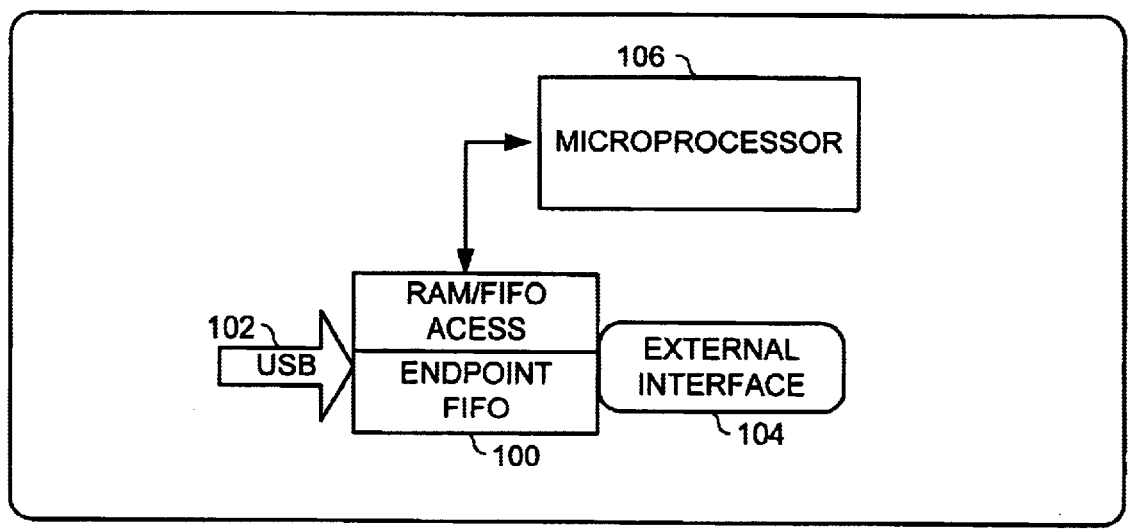
FIG. 3 is a block diagram illustrating a preferred embodiment of the present invention.

Referring to FIG. 3, a block diagram of a circuit 100 is shown in accordance with a preferred embodiment of the present invention. The circuit 100 may be implemented, in one example, as an endpoint FIFO. The circuit 100 may be used to transfer data, in one example, from a bus 102 to a circuit 104. The bus 102 may be implemented, in one example, as a serial, packetized bus operating in a first clock domain (e.g., a USB 2.0 bus in accordance with the Universal Serial Bus Specification 2.0). The bus 102 may connect the circuit 100 to a host system (e.g., a PC). The circuit 104 may be implemented, in one example, as an external interface circuit operating in a second clock domain (e.g., the external interface logic with respect to the bus 102). The circuit 100 may be configured, in one example, to transfer data without bandwidth constriction and/or the cost of an intermediate rate-matching FIFO. The circuit 100 generally reduces to zero the time required to transfer data from an endpoint FIFO into an interface FIFO.

The circuit 100 may be connected, in one example, to a microprocessor 106. The microprocessor 106 may be configured, in one example, to (i) access the circuit 100 as a random access memory and (ii) present one or more control signals to one or more inputs of the circuit 100. By combining the functions of an interface FIFO and an endpoint FIFO, while still allowing microprocessor access to FIFO data, the circuit 100 may provide improved bandwidth.

Figure 4:
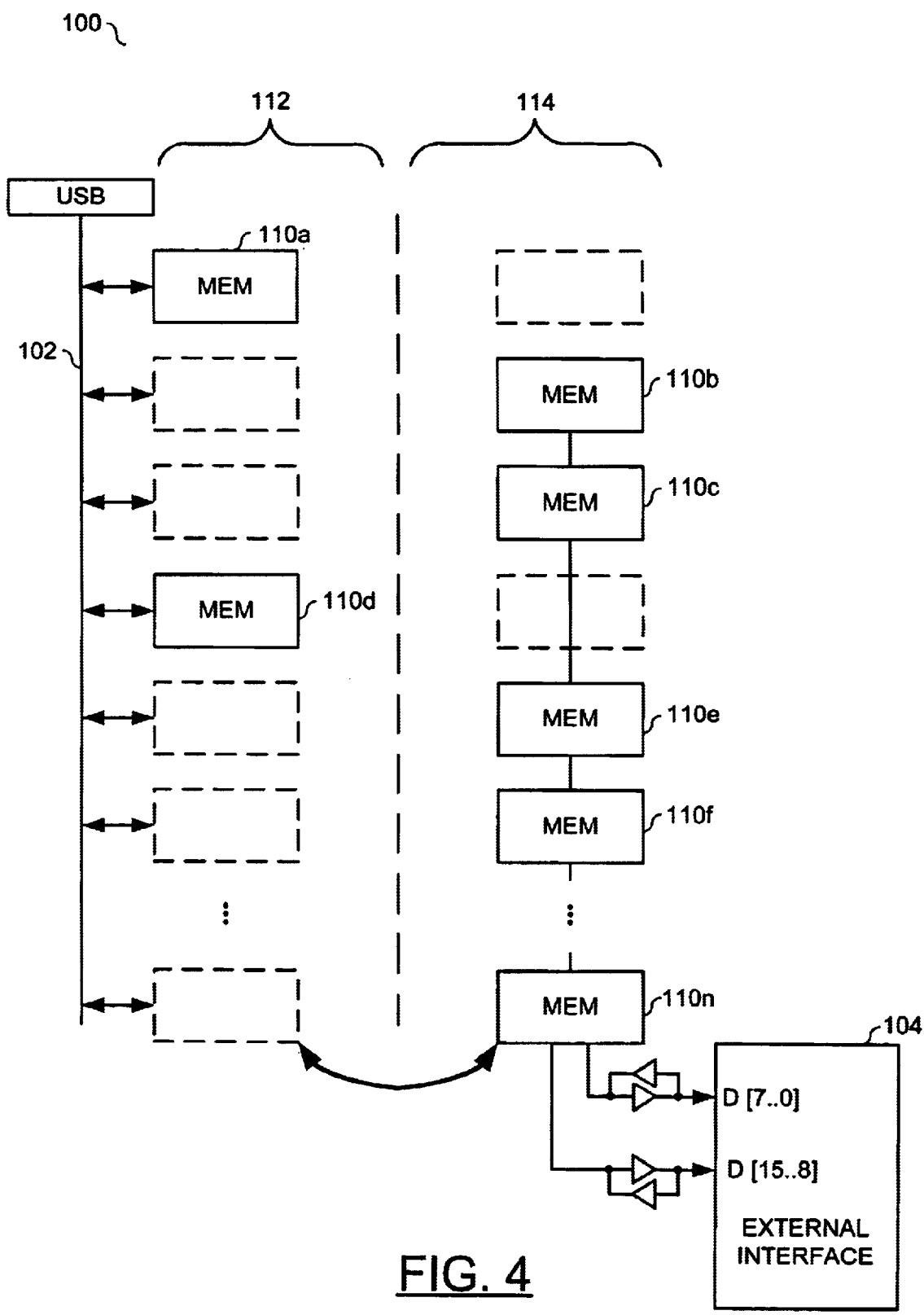
FIG. 4 is a detailed block diagram illustrating an operation of the present invention.

Referring to FIG. 4, a detailed block diagram illustrating a preferred embodiment of the circuit 100 is shown. The circuit 100 may comprise a number of storage elements 110a–110n. The storage elements 110a–110n may be implemented, in one example, as discrete random access memory (RAM) blocks. When the storage elements 110a–110n are implemented as RAM blocks, the storage elements 110a–110n may be single-port RAM elements or multi-port RAM elements. When the bus 102 presents packetized data, the storage elements 110a–110n may be configured, in one example, to hold a single packet of data.

The storage elements 110a–110n may be switched very quickly between the first clock domain (e.g., a circuit portion 112) and the second clock domain (e.g., a circuit portion 114). In one example, a number of multiplexer circuits may be used to switch each of the storage elements 110a–110n from one domain to the other domain.

During an operation of the circuit 100, one or more of the storage elements 110a–110n may be transferring data with the bus 102 in the first clock domain 112 (e.g., 110a and 110d), while one or more others of the storage elements 110a–110n may be transferring data with the circuit 104 in the second clock domain 114 (e.g., 110b, 110c, 110e, 110f, 110n, etc.). The storage elements 110a–110n may be switched completely from one clock domain (e.g., 112) to the other clock domain (e.g., 114). By completely switching the clock domain (e.g., 112 or 114) in which a particular storage element (e.g., 110i) operates, read/write and/or read/read contentions may be eliminated. By eliminating read/write and/or read/read contentions, the circuit 100 may simplify logic requirements of a particular application.

When data is transferred from the bus 102 to the circuit 104 (e.g., a USB OUT operation), a particular storage element (e.g., 110d) in the first domain 112 (e.g., a USB domain) generally fills with data (e.g., USB data) from the bus 102. When a full packet has been received, internal logic of the particular storage element 110d may be configured to check the data for transmission errors. If no errors are found, the internal logic may be configured to switch the particular storage element 110d to the second domain 114 (e.g., an external interface domain). When the particular storage element 110d is switched to the second domain 114, the packet generally becomes a portion of an output FIFO. The storage elements 110a–110n are actually part of the same FIFO regardless of the domain, but the analogy of separate FIFOS (e.g., USB and interface) is convenient for explanation purposes. Switching a storage element between the first and second domains may occur virtually instantaneously. In one example, switching a storage element between domains may require only one clock period. For example, a clock running at 48 MHz gives a clock period of 20.8 nanoseconds.

When data is transferred from the circuit 104 to the bus 102 (e.g., a USB IN operation), a particular storage element (e.g., 110b) in the second domain 114 is generally filled via the circuit 104 (e.g., an external interface). When a full packet is received, the internal logic generally switches the particular storage element 110b virtually instantaneously to the first domain (e.g., a USB domain). Once the storage element 110b is switched to the first domain, the storage element 110b generally waits for a transfer request (e.g., a USB IN signal) from the host. When the transfer request is received, the data in the storage element 110b is generally transferred to the host via the bus 102.

The host generally checks the data transferred for errors. If the host indicates that no data errors occurred during the transfer, internal logic of the storage element 110b may be configured, in one example, to switch the storage element back to the second domain 114. The storage element 110b may then accept more data from the circuit 104. However, if the host indicates that a transmission error occurred, internal logic of the storage element 110b may be configured, in one example, to re-send the data in response to a subsequent transfer request, until no errors are indicated. When an error free data transfer is indicated by the host, the storage element 110b is generally switched back to the second domain.

The storage elements 110a–110n may be implemented as fairly small storage elements (e.g., 256×16). By selecting a small size for the storage elements 110a–110n, the circuit 100 may be configured to provide a FIFO with fine granularity. A FIFO with fine granularity may be highly configurable. For example, fine granularity may allow precise selection of endpoint sizes and/or degrees of buffering provided by the circuit 100. Fine granularity may also allow, in one example, variable FIFO length (e.g., concatenating blocks) or "ping-pong" buffering (e.g., swapping blocks). Due to the packetized nature of USB data, a FIFO with fine granularity may be very desirable in a USB system.

Figure 5:
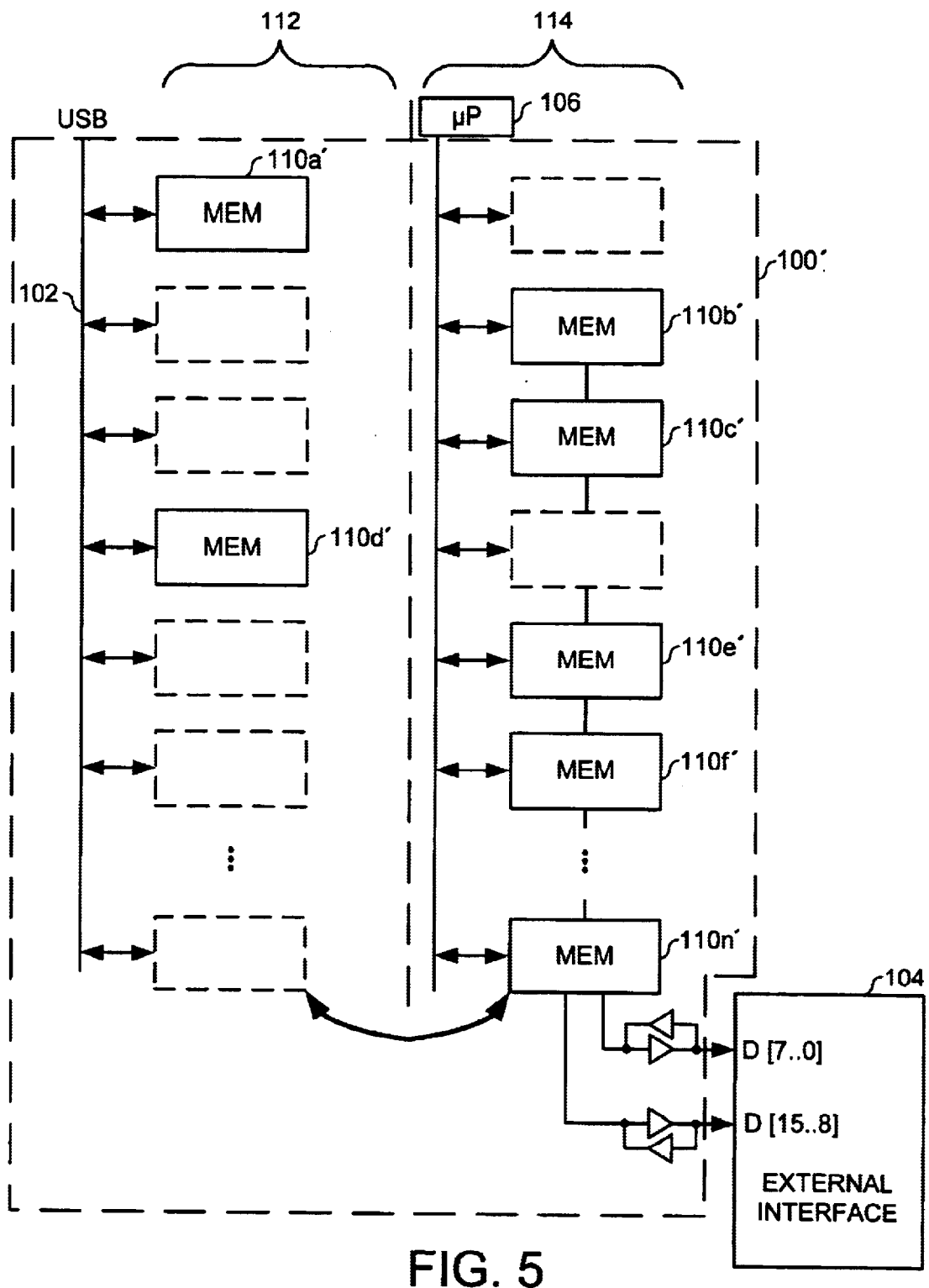
FIG. 5 is a detailed block diagram illustrating an alternative operation of the present invention.

Referring to FIG. 5, a detailed block diagram of a circuit 100' illustrating an alternative embodiment is shown. When multi-port access is required, the storage elements 110a'–110n' may be implemented as multi-port RAMs. When the storage elements 110a'–110n' are implemented as multi-port RAMs (e.g., dual-port RAMs), the present invention may provide an apparent extra port. For example, the present invention may provide triple-port access using dual-port RAMs. When a particular one of the storage elements 110a'–110n' is in the first clock domain 112, a first port of the particular one of the storage elements 110a'–110n' may be connected to the bus 102. When the particular one of the storage elements 110a'–110n' is in the second clock domain 114, the first port may be connected to the microprocessor 106 and a second port of the particular one of the storage elements 110a'–110n' may be connected to the circuit 104 (e.g., an external interface).

Figure 6:
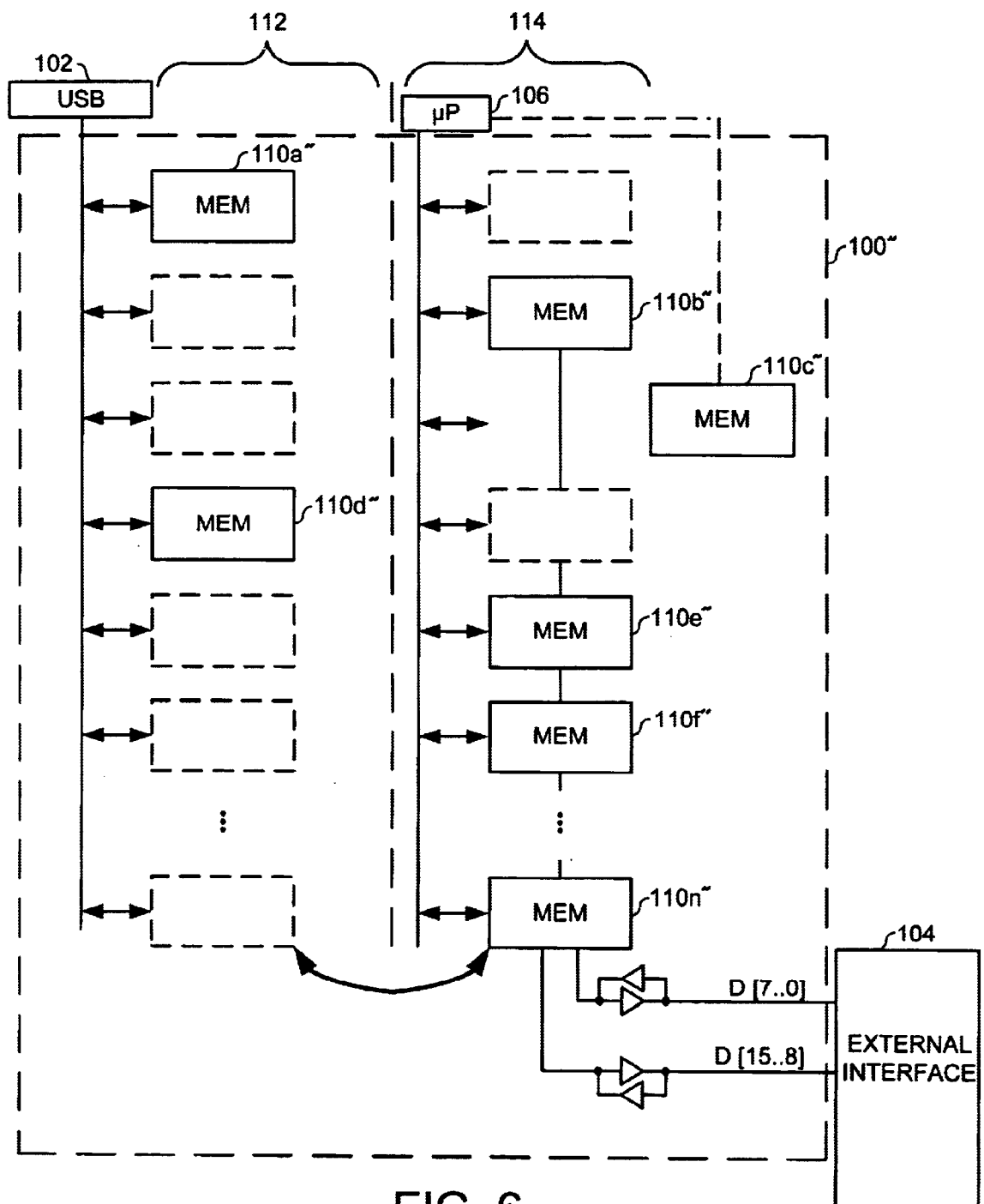
FIG. 6 is a detailed block diagram illustrating another alternative operation of the present invention.

Referring to FIG. 6, a detailed block diagram of a circuit 100" illustrating another alternative embodiment of the arm present invention is shown. The circuit 100" may be configured to insert or not insert a particular storage element (e.g., 110c") into a FIFO chain in the second clock domain 114, in response to a signal presented by the microprocessor 106. The microprocessor 106 may be configured to generate the signal based on, in one example, data contained within the particular storage element 110c". When the microprocessor 106 determines where to insert a particular storage element, there is generally no need for the microprocessor 106 to monitor the USB data transferred from the bus 102 to the particular storage element. Since there is generally no need to monitor the data transferred between the bus 102 and the storage elements 110a"–110n", the dual-port nature of the storage elements is generally not used in the first clock domain 112 (e.g., the USB domain).

Figure 7:
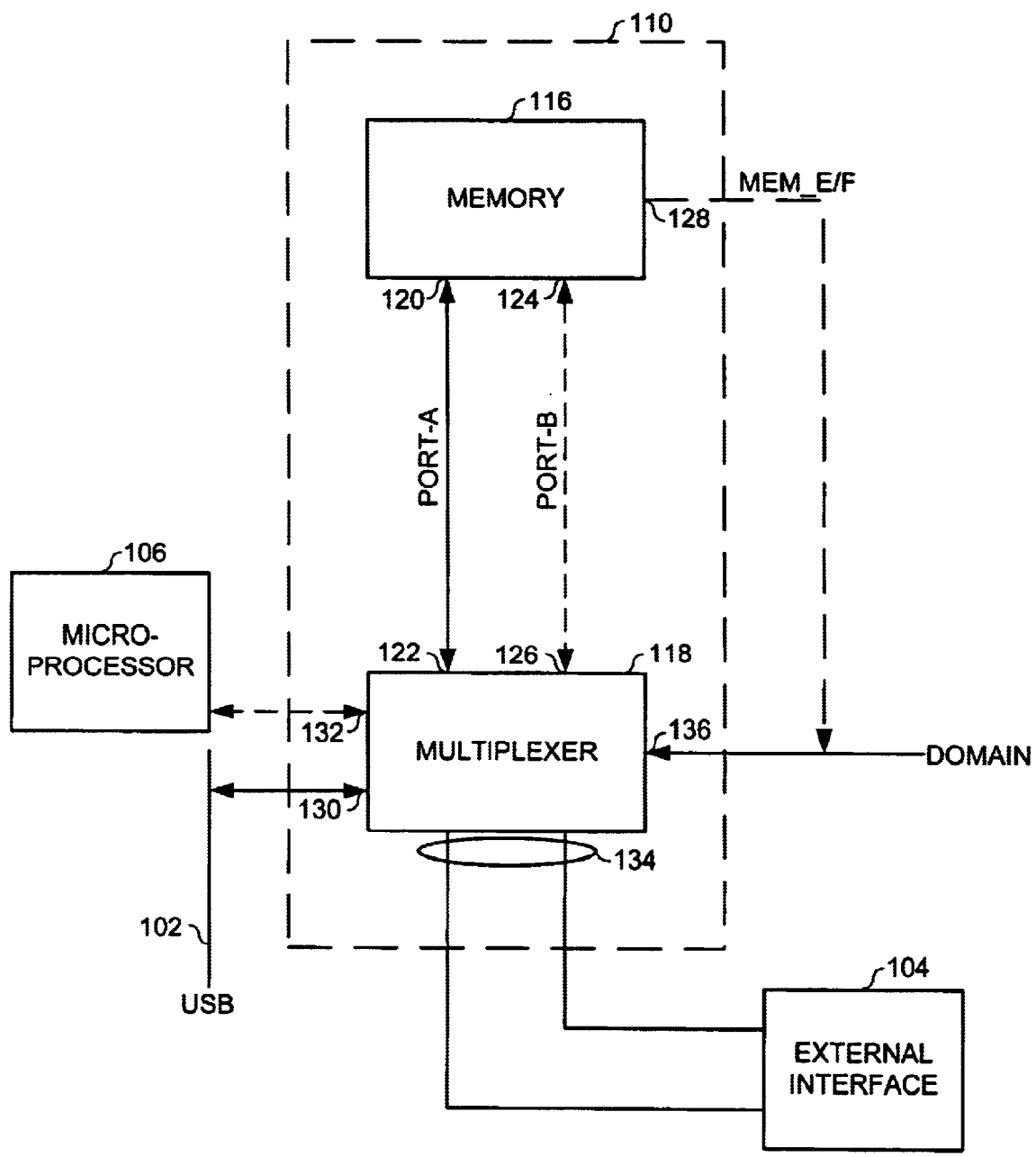
FIG. 7 is a more detailed block diagram of a storage element of FIGS. 4–6.

Referring to FIG. 7, a more detailed block diagram illustrating a storage element 110 implemented in accordance with the present invention is shown. The storage element 110 may comprise a memory circuit 116 and a multiplexer circuit 118. When the storage element 110 is implemented as a single-port RAM, the memory circuit 116 may have an input/output 120 that may receive/present a data signal (e.g., PORT_A) to an input/output 122 of the multiplexer circuit 118. When the memory circuit 116 is implemented as a dual-port RAM, the memory circuit 116 may also have an input/output 124 that may be used to receive/present a signal (e.g., PORT_B) from/to an input/output 126 of the multiplexer 118. The memory circuit 116 may have an output 128 that may present a status signal (e.g., MEM_E/F). The status signal MEM_E/F may be used to indicate that the memory circuit 116 is full and/or empty.

The multiplexer circuit 118 may have an input/output 130 that may receive/present data from/to the bus 102, an input/output 132 that may receive/present data from/to the microprocessor 106, an input/output 134 that may receive/present data from/to the circuit 104, and an input 136 that may receive a control signal (e.g., DOMAIN). The signal DOMAIN may have a first and a second state.

When the memory circuit 116 is implemented as a single-port memory element, the multiplexer circuit 118 may be configured, in one example, to (i) connect the input/output 122 to the input/output 130 in response to the signal DOMAIN being in the first state and (ii) connect the input/output 122 to the input/output 134 in response to the signal DOMAIN being in the second state.

When the memory circuit 116 is implemented as a dual-port memory element, the multiplexer circuit 118 may be configured, in one example, to (i) connect the input/output 122 to the input/output 130 in response to the signal DOMAIN being in the first state and (ii) connect the input/output 122 to the input/output 132 and the input/output 126 to the input/output 134 in response to the signal DOMAIN being in the second state.

In one example, the signal MEM_E/F may be used as the signal DOMAIN. When the signal MEM_E/F is used as the signal DOMAIN, the storage element 110 may switch between clock domains 112 and 114 in response to the memory circuit 116 filling up or emptying out. For example, when the storage element 110 is in the first domain 112, a data packet may be stored in the memory circuit 116. When the data packet is stored, the memory circuit 116 will generally be filled. When the memory circuit 116 is filled, and the data has been verified to be error free, the signal MEM_E/F may be asserted (e.g., a digital HIGH, or 1) to indicate that the memory circuit is filled. When the signal MEM_E/F is asserted, the multiplexer circuit 118 may be configured to switch the storage element 110 from the first domain 112 into the second domain 114. When the storage element 110 is switched to the second domain 114, the packet stored in the memory circuit 116 may be transferred through the multiplexer circuit 118 to the circuit 104.

Once the packet has been transferred, the memory circuit 116 will generally be empty. When the memory circuit 116 is empty, the signal MEM_E/F may be deasserted (e.g., a digital LOW, or 0) to indicate that the memory circuit 116 is empty. The multiplexer circuit 118 may be configured to switch the storage element 110 back to the first domain 112 in response to the signal MEM_E/F being deasserted. The storage element 110 may be used to transfer packets from the first domain 112 to the second domain 114. Similarly, the storage element 110 may transfer packets in the opposite direction.

The circuit 100 may provide an endpoint FIFO in a system that delivers data in packets, where the packets are synchronized by a first clock and transferred to an interface synchronized by a second clock. The circuit 100 may provide a system that decouples the clocks and allows high-bandwidth transfers across the interface without requiring an intermediate FIFO or multi-port memory.

The circuit 100 may provide the capability for intelligent means to selectively make packets available in the data stream delivered over the interface.

In an alternative embodiment, a single storage element may be used. However, identification of data by endpoint and simultaneous access by two clock domains may require additional logic. When data in the FIFO is found to contain errors, de-committing (e.g., removing) the erroneous data from the FIFO may be cumbersome or impossible.

In the present invention, data bytes are generally not moved internally. Instead, discrete storage elements (e.g., FIFO blocks) may be instantaneously switched between a first domain (e.g., USB) and a second domain (e.g., input/outputs to external logic). When a storage element is switched to a particular domain, the packet within the storage element generally forms a portion of a FIFO that may be larger than the block size of the storage element. Internal logic of the storage element generally manages the insertion of the packet into the FIFO. The circuit 100 generally provides for a zero transfer time compared with a conventional slave FIFO approach.

To an external interface, the circuit 100 may appear to be a general purpose FIFO (e.g., a 1024 byte FIFO). A status flag (e.g., EMPTY) may be presented to the external interface. The signal EMPTY may be asserted (e.g., a digital HIGH, or 1) when there is no data in the FIFO. At a later time, the signal EMPTY may be de-asserted (e.g., a digital LOW, or 0) to indicate that there is data in the FIFO. Instead of the signal EMPTY being deasserted when a single byte enters the circuit 100 (as is the case for a general purpose FIFO), the signal EMPTY is generally deasserted when a packet of data (e.g. 512 bytes) is transferred into the circuit 100. In general, data may be switched into and out of the first domain and the second domain FIFOs in quanta (e.g., packets).

The various signals are generally "on" (e.g., a digital HIGH, or 1) or "off" (e.g., a digital LOW, or 0). However, the particular polarities of the on (e.g., asserted) and off (e.g., deasserted) states of the signals may be adjusted (e.g., reversed) accordingly to meet the design criteria of a particular implementation.

The use of multiple small single or multi-port RAMs as FIFOs may save one RAM port (e.g., 2→1 or 3→2) and simplify logic. In addition, the granularity offered by using multiple small RAMs may be well suited to an architecture that provides multiple addressable FIFOS (e.g., USB, where the FIFOS are called endpoints). A microprocessor may be configured to examine packets and choose whether a packet is connected as part of an output FIFO.

The present invention may provide a low cost solution for very high bandwidth transfers between a USB 2.0 bus and the external logic. For example, in a hard disk or CDROM application, data may travel over an ATAPI interface at burst rates of 66 Megabytes per second. USB 2.0, with a delivery rate of 480/8=60 Megabytes per second, may provide a close match. However, the rates may be matched only with an architecture that generally consumes no time transferring data between endpoint buffers and the ATAPI interface (e.g., no interface FIFO).

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   an external interface; and
   a plurality of storage elements each configured to operate
      (i) as part of an endpoint FIFO configured to transfer data between said apparatus and a bus in response to a first state of one or more control signals and (ii) as part of an interface FIFO of said external interface in response to a second state of said one or more control signals, wherein each of said plurality of storage elements comprises (i) a memory circuit having a bidirectional input/output and (ii) a multiplexer circuit configured to switch said bidirectional input/output between a first domain of said bus and a second domain of said external interface in response to said one or more control signals.

2. The apparatus according to claim 1, wherein said first and second domains comprise clock domains operating at different clock rates.

3. The apparatus according to claim 1, wherein said plurality of storage elements are configured to provide a plurality of FIFOs.

4. The apparatus according to claim 1, further comprising:
a control circuit configured to generate said one or more control signals in response to one or more input signals.

5. The apparatus according to claim 1, wherein said storage elements comprise single-port or multi-port memory elements.

6. The apparatus according to claim 5, wherein said multi-port memory elements comprise dual-port memory elements.

7. The apparatus according to claim 5, wherein said memory elements comprise random access memory (RAM).

8. The apparatus according to claim 1, wherein each of said storage elements is configured to store a single packet of data.

9. The apparatus according to claim 1, further comprising a microprocessor or micro-controller configured to access said plurality of storage elements as a random access memory.

10. The apparatus according to claim 1, wherein said second domain comprises one or more FIFOs.

11. The apparatus according to claim 10, wherein one or more of said plurality of storage elements are switched to one of said one or more FIFOs in response to data stored within said one or more storage elements.

12. The apparatus according to claim 11, wherein:
a microprocessor or micro-controller selects the FIFO in said second domain to which said one or more of said plurality of storage elements are switched in response to data stored within said one or more storage elements.

13. The apparatus according to claim 4, wherein said storage elements are configured to generate said one or more input signals.

14. The apparatus according to claim 13, wherein said one or more input signals indicate whether each of said plurality of storage elements is full and/or empty.

15. An apparatus comprising:
means for storing single packets of data in each of a plurality of discrete storage elements; and
means for switching each of said plurality of discrete storage elements between (i) operating as part of an endpoint FIFO configured to transfer said packets of data between said apparatus and a bus in a first domain and (ii) operating as part of an interface FIFO of an external interface of said apparatus in a second domain in response to one or more control signals.

16. The apparatus according to claim 15, further comprising means for generating said one or more control signals in response to one or more input signals.

17. The apparatus according to claim 15, further comprising means for examining data contained in said plurality of discrete storage elements.

18. A method for dynamically transferring data between a universal serial bus (USB) and a USB peripheral comprising the steps of:
(A) reading from or writing to each of a plurality of discrete storage elements each operating in a first domain as part of one or more endpoint FIFOs;
(B) switching each of said plurality of discrete storage elements from operating as part of said one or more endpoint FIFOs in said first domain to operating as part of one or more interface FIFOs of an external interface in a second domain in response to a first state of one or more control signals;
(C) writing to or reading from each of said plurality of discrete storage elements operating as part of said one or more interface FIFOs in said second domain; and
(D) switching each of said plurality of discrete storage elements from operating as part of said one or more interface FIFOs in said second domain to operating as part of said one or more endpoint FIFOs in said first domain in response to a second state of said one or more control signals.

19. The method according to claim 18, further comprising the step of:
generating said one or more control signals in response to data contained within said storage elements.

20. The method according to claim 18, wherein said plurality of discrete storage elements are accessible as random access memory by a microprocessor.

* * * * *